US012570838B2

(12) United States Patent
Thompson

(10) Patent No.: US 12,570,838 B2
(45) Date of Patent: Mar. 10, 2026

(54) ANTIMICROBIAL PLASTIC

(71) Applicant: IMPACT BIOLIFE SCIENCE, INC., Houston, TX (US)

(72) Inventor: Daryl L. Thompson, Winter Haven, FL (US)

(73) Assignee: Impact Biolife Science, Inc., Houston, TX (US)

( * ) Notice: Subject to any disclaimer, the term of this patent is extended or adjusted under 35 U.S.C. 154(b) by 745 days.

(21) Appl. No.: 17/893,623

(22) Filed: Aug. 23, 2022

(65) Prior Publication Data

US 2024/0084112 A1 Mar. 14, 2024

(51) Int. Cl.

| | |
|---|---|
| ***C08L 5/08*** | (2006.01) |
| ***C08K 5/1545*** | (2006.01) |
| ***C08L 1/02*** | (2006.01) |
| ***C08L 25/06*** | (2006.01) |

(52) U.S. Cl.

CPC .............. *C08L 5/08* (2013.01); *C08K 5/1545* (2013.01); *C08L 1/02* (2013.01); *C08L 25/06* (2013.01)

(58) Field of Classification Search

CPC ... C08L 5/08; C08L 1/02; C08L 25/06; C08K 5/1545; C08K 5/0058

See application file for complete search history.

(56) References Cited

U.S. PATENT DOCUMENTS

| | | | | |
|---|---|---|---|---|
| 2021/0277221 | A1* | 9/2021 | Okaniwa | H01L 23/293 |
| 2021/0290514 | A1* | 9/2021 | Fricke | A61P 17/00 |
| 2021/0388176 | A1* | 12/2021 | Metzsch-Zilligen | C08K 5/005 |

FOREIGN PATENT DOCUMENTS

| | | | | | |
|---|---|---|---|---|---|
| CA | 2523365 | | | 6/2014 | |
| CA | 2523365 | C | * | 6/2014 | A01N 59/16 |
| CN | 112796167 | A | * | 5/2021 | D21H 21/36 |
| WO | WO-0166084 | | | 9/2001 | |

OTHER PUBLICATIONS

International Preliminary Report on Patentability dated Mar. 6, 2025 in PCT/US23/72436.

International Search Report dated Nov. 30, 2023 in PCT/US23/72436.

Written Opinion dated Nov. 30, 2023 in PCT/US23/72436.

Bagher, et al., "Wound healing with alginate/chitosan hydrogel containing heperidin in rat model", 2020, pp. 1-8, vol. 55, Journal of Drug Delivery Science and Technology.

* cited by examiner

*Primary Examiner* — Kumar R Bhushan

(74) *Attorney, Agent, or Firm* — Stephen J. Weyer, Esq.; Stites & Harbison, PLLC

(57) ABSTRACT

A bioplastic additive and antimicrobial plastic includes a polyphenol and an organic polymer. The polyphenol may be a phenol, polyphenol, bioflavenoid, flavonoid, tannin, coumarin, lagman, quinone, stibene or qurcuminoidstenin. The organic polymer may be chitosan, chitin, cellulose and keratin. In one advantageous form, the polyphenol is hesperidin and the organic biopolymer is chitosan.

10 Claims, 8 Drawing Sheets

ANTIMICROBIAL PLASTIC

FIELD OF THE INVENTION

The present invention relates to a plastic or polymer and in particular an anitmicrobial plastic or polymer.

BACKGROUND OF THE INVENTION

Various surfaces and the materials that comprise surfaces are potential breeding grounds for microbes such as bacteria and fungi. In addition, various materials and surfaces may prove to be hospitable to sustain viruses.

The global SARS-CoV-2 pandemic has caused a great demand for new technologies and products with antimicrobial properties. Since many consumer products contain some form of plastic or plastic material, it would be beneficial to have plastic additive with antimicrobial properties, including an additive targeting infectious viral strains such as Rhinovirus, Influenza, SARS, SARS-CoV-2 (i.e. COVID-19) as well as dangerous bacterial strains such as *E. coli*, Staphylococcal bacterial, Methicillin-resistant *Staphylococcus aureus* (methicillin-resistant *Staphylococcus aureus* (MRSA) and Methicillin Susceptiable *Staphylococcus aureus* (MSSA).

Recently, antimicrobial additives or agents including antiviral additives have been incorporated in different materials including plastics. However, there are limitations in effectiveness of prior antimicrobial agents including antiviral additives for plastics. For example, typical antimicrobial additives in use today are metals such as zinc and ionic silver, thiazoles and halogenated compounds. While these additives are effective, they have a negative aspect due to their toxicity within the environment. Specifically due to the current SARS-CoV-2 crisis there is significant concern for overuse of these materials and subsequent dangerous buildup of these materials in the environment with dire longer term exposure consequences.

There has been and remains a pronounced lack of innovation within this field for microbe resist plastic, polymers and plastic surfaces. For example, the most utilized antimicrobial plastic additive to date has been the metals, such as silver, zinc and copper. The only recent advances has been the simple combination of these metals with either themselves or other ionic or non-reactive compounds. This can be illustrated with the following examples: silver/zinc/copper, silver/citrate, silver sulfadiazine, silver phosphate, silver ceramic, silver palladium, silver platinum, silver zeolite, silver copper, silver/glass and so on. These combinations are routinely repeated with the substitution of either zinc or copper metallic ions instead of silver.

Another current limitation within the field of bioplastics (e.g. antimicrobial plastics) is the delivery method of the antimicrobial agents. The current applications of antimicrobial agents is reliant on integrated migration. With integrated migration, the additive is mixed within the plastic material and simply migrates or diffuses toward the surface of the material due to the inherent incompatibility gradients between the antimicrobial additive and the polymer substrate. This technique and mode of action is not only inefficient but also creates weaknesses and structural instabilities within plastic material itself due to mechanical destabilization of structural polymerization.

A further limitation within the field of bioplastics is toxicity due to inherent acute and chronic toxicity. The primary issues with toxicity with the current state of the art are not directed towards humans but are more focused on the impact of aquatic systems due to run-off from landfills as well as the potential for destruction of oceanic marine systems. The current technologies; silver, zinc, copper, arsenic, triclosan, thiazole, arsenic, and Oxybisphenoxarsine (OBPA) have demonstrated significant potential for marine toxicity.

Still another limitation within the field is thermal degradation. Most of the current antimicrobial compounds in use today have thermal decomposition constants that are close to that of the matrix polymer themselves. This is a significant drawback due to the fact that as the temperature of the bioplastic increases it will also increase the motility of the additives and influence or increase the rate of migration. This factor significantly affects and reduces the lifespan and usefulness of the additives.

Another important limitation is the lack of sophisticated or targeted efficacy. Current antimicrobial compounds in use work by a very simple mechanism. Their antimicrobial activity functions by interacting with and crippling key metabolic enzymes upon exposure. This one sided and simplistic approach limits there efficacy, duration, and use, especially against non-envelope microbials such as rhinovirus. A much more sophisticated and multi approach is needed to create an improved antimicrobial agent.

SUMMARY OF THE INVENTION

The present invention is directed to bioplastics including bioplastic materials and/or plastic additives which when combined with plastics including polymers have antimicrobial properties including antiviral properties. These properties include but are not limited to antiviral properties which create an inhospitable environment for viruses such as SARS-CoV-2. The present additives results in plastics which create an environment which is inhospitable to microbes including viruses thus preventing microbial growth as well as viral sustainability.

The present invention, in one form thereof, is directed to an antimicrobial polymer additive which comprises a polyphenol and an organic polymer. In one advantageous form, the polyphenol is hesperidin. In an alternative advantageous form, the organic polymer is selected from the group consisting of chitosan (also known as chitosen), chitin, cellulose and keratin.

In another aspect of the present invention, the aforementioned antimicrobial polymer may be added to one or more of the following polymers: chitosan and hesperidin.

In yet another alternative further form, the polyphenol is 1-3% hesperidin and the organic biopolymer is 1-5% chitosan.

Without being limited any particular mechanism of antimicrobial properties, the polyphenol such as hesperidin creates a surface structure such as a "poison tip" which is inhospitable to microbes. For example, when the present polyphenol is added to a plastic polymer or plastic, the material has antimicrobial properties. Accordingly, the present antimicrobial polymer including a polyphenol and an organic polymer may be formulated as a surface laminate thus creating an antimicrobial surface.

In addition, the polyphenol and organic biopolymer can be added to paints or formulated as plastics used in medical devices such as implants and bandages.

In various alternative forms, the polyphenol or phenolic compound is hesperidin or any phenol/polyphenol including bioflavenoid, flavinoid, tannin, coumarin, lagman, quinone, stibene or qurcuminoids.

BRIEF DESCRIPTION OF THE DRAWINGS

The present invention will now be described with reference to the drawings as follows.

DETAILED DESCRIPTION

Figure 1:
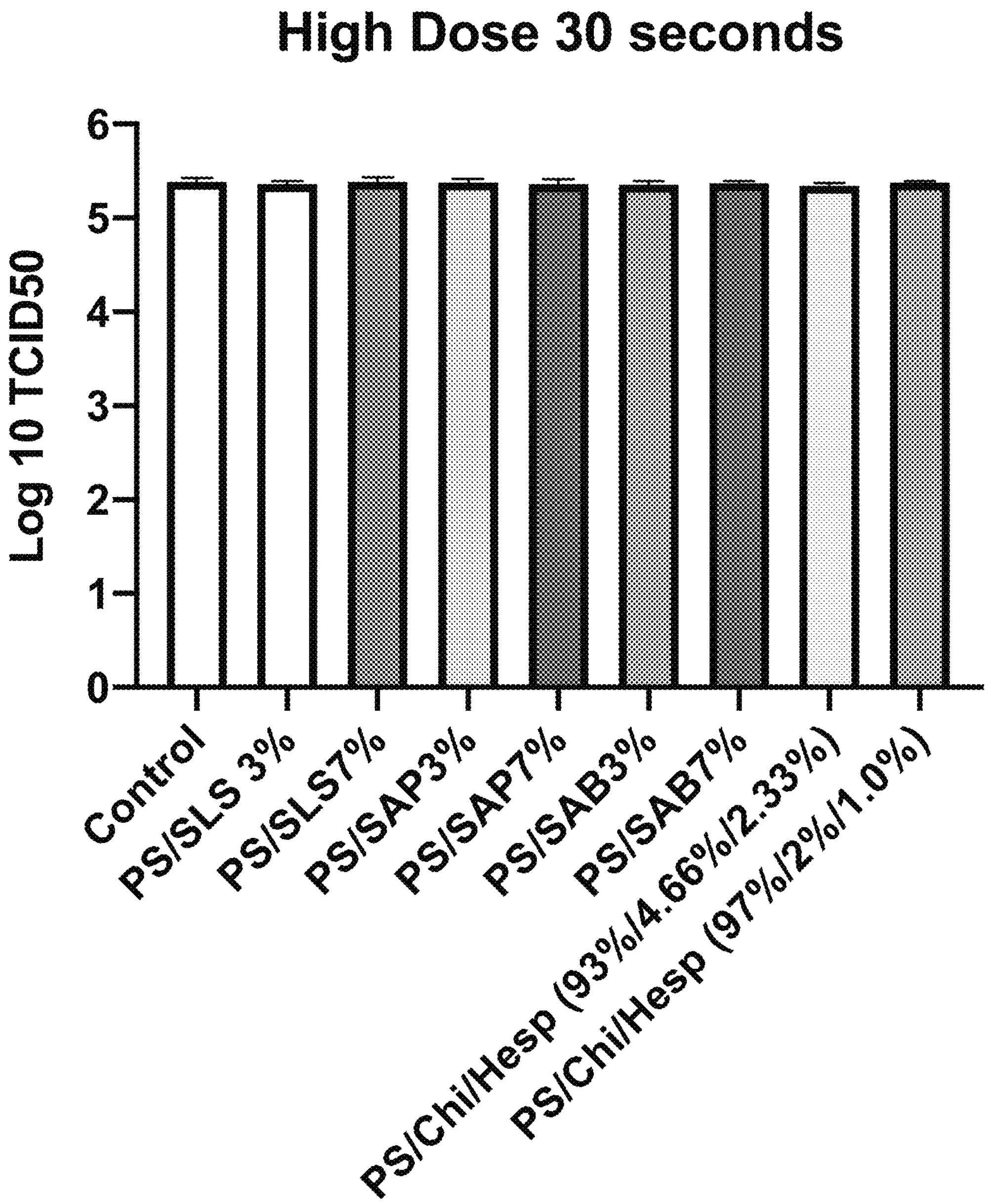
FIG. 1 is a graph comparing microbial growth for various materials in accordance with the present invention.

The present antimicrobial additives and incorporated into plastics forms bioplastics as a result from a unique combination of materials is inhospitable for microbes. The present material is stable and has no known toxic properties making it uniquely and well suited for use in various materials where one wishes to have antimicrobial properties.

Without being bound to any particular mechanism of antimicrobial efficacy, a combination of various additive materials produces a physical structure which proves to be inhospitable to microbes. At a microscopic level, the present bioplastic has microscopic spears within the matrix of the polymer of the bioplastic. The spears or spires may serve to proactively puncture a cell wall of bacteria (microbe). For example, when the organic polymer is chitosan, spires of the chitosan may act as a spear to puncture the cell wall of a living microbe.

In one form of antimicrobial polymer, the polymer includes a polyphenol and an organic biopolymer. The organic biopolymer can be chitosan and the polyphenol can be hesperidin. Advantageous, the chitosan forms microscopic spires within a plastic matrix of the polymer. This serves several functions. First, the chitosan spires are believed to lyse or puncture the membrane of a microbe. Second, the chitosan spire will proactively deliver an antimicrobial agent, i.e., hesperidin, into the cell wall of the microbe. This is an improved method of delivery over the more passive reliance of migration as previously known in the art. This proactive nature significantly contributes to increased kill time against a microbial agent.

Advantages of when the polyphenol is hesperidin and the organic polymer is chitosan is that the two are stable having a melting point of 290° C. for chitosan and 250° C. for hesperidin. An additional benefit to hesperidin is that it has both advantageous thermal and radioprotective properties. These properties help ensure that the plastic will have enhanced thermal and electromagnetic, (e.g., UVA and UVB), characteristics or properties. Hesperidin also acts to stabilize thermal degradation due to the nature of its antioxidant properties.

Further, when the antimicrobial polymer comprises chitosan, the chitosan improves antimicrobial efficacy by proactively lysing antimicrobial membranes and also serves as a delivery method for the antimicrobial agent hesperidin. In addition, hesperidin itself acts as the antimicrobial agent.

Hesperidin utilizes a multiple aspect approach to inhibiting microbial activity. First, hesperidin inhibits biofilm formation, especially B-lactamase. Second, hesperidin inhibits viral replication such as polymerase, helicase, and ATPase. A third aspect of hesperidin is that it downregulates auto induction (aggressiveness) of microbial agents by direct influence of quorum sensing by inhibition of acyl-homoserine lactase.

Chitosan is produced commercially by the assimilation of chitin, which is the structural element in the exoskeleton of crustaceans such as crabs and shrimp and the cell wall of fungi. The chemical structure of chitin has two two of the N-acetylglucosamine units that repeat to form long chains in β-(1→4)-linkage resulting in the structure:

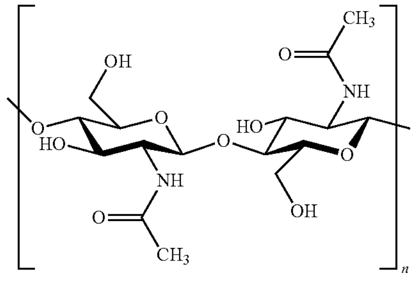

The chemical structure of chitosan is shown below:

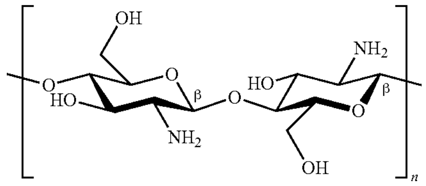

The present invention will now be described with regard to experiments demonstrating the antimicrobial properties of the present bioplastics and/or bioplastic additives.

Experiment 1

Experimental Data

Plastic samples comprising polystyrene were created for testing against SARS-CoV-2 in a Biosafety 3 facility. Control samples were created using polystyrene as a base. Also two "testing" articles/platforms were created. The testing articles consisted of a polystyrene base and different concentrations of chitosan and hesperidin. The two formulas tested are as follows; formula (1)=(polystyrene (97%), chitosan (4.66%), hesperidin (2.33%), formula (2)=(polystyrene (97%), chitosan (2%), hesperidin (1%).

Samples were sent to a Biosafety 3 facility for testing against SARS CoV-2. The testing procedures were designated to follow ISO22196. The samples were tested in both high and low viral ranges. The high viral ranges were $2.5\times10^5$ and the low viral ranges were $2.5\times10^3$.

Results

The control samples demonstrated now viral reduction, however, the testing samples demonstrated exceptional antiviral capabilities. Plastics coated with polystyrene/chitosan/hesperidin at 93%/4.66%/2.33% and polystyrene/chitosan/hesperidin at 97%/2%/1% reduced SARS-CoV-2 by more than 1 log(10) fold (90% reduction) by 30 minutes and approximately 2 log(10) fold (99% reduction) in two hours. The testing demonstrated that the antimicrobial curve of the testing articles against SARS-CoV-2 continued to increase in logarithmic reduction past the 6 hour mark.

The results demonstrate an incredibly fast antimicrobial affect, 90% reduction of viral load within 30 minutes. It should be pointed out that the 30 minute mark in which the samples were first analyzed is the fastest that the laboratory should inoculate and then assay. It is in agreement that the plastics began killing the virus immediately due to the high degree of antimicrobial activity at the 30 minute mark.

The rapid antimicrobial efficacy demonstrated in this study are attributed to advanced and synergistic mechanisms employed with the innovative use of chitosan and hesperidin to yield an effective microscopic mechanistic tool that exceeds functionality above and beyond that exists within the one dimensional approach described within the current state of the art.

Experiment 2

Objective

To determine the anti-SARS-CoV-2 effect of bioplastics coated plastics.

Experimental Overview $2.5\times10^5$ or $2.5\times10^3$ TCID50 of SARS-CoV-2 was deposited on provided coupons in 400 μl volume. The materials were transferred to an incubator maintained at 25° C. and incubated for various time periods. For 30 seconds treatments, the material was left on the bench top of a biosafety cabinet for appropriate time.

The coupons was incubated at room temperature for 30 s, 30 min, 2 hr, and 6 hr. The viral suspension deposited were collected, coupons washed thrice to a total volume of 1 ml. The collected suspension were diluted, and various dilutions plated on Vero E6 cells to determine the TCID50.

All recovered TCID50 are compared with that obtained on control material supplied by GRDG.

Coating/Surfaces to be Tested

Control PS
PS/SLS (W)
PS/SLS (7%)
PS/SAP (3%)
PS/SAP (7%)
PS/SAB (3%)
PS/SAB (7%)
PS/chitosan/hesperidin (93%/4.66%/2.33%)
PS/Chitosan/Hesperidin (97%/2%/1.0%)

Doses of Virus Deposited on the Surface

High Dose—$2.5\times10^5$ TCID50
Low Dose—$2.5\times10^5$ TCID50

Abbreviations

Figure 2:
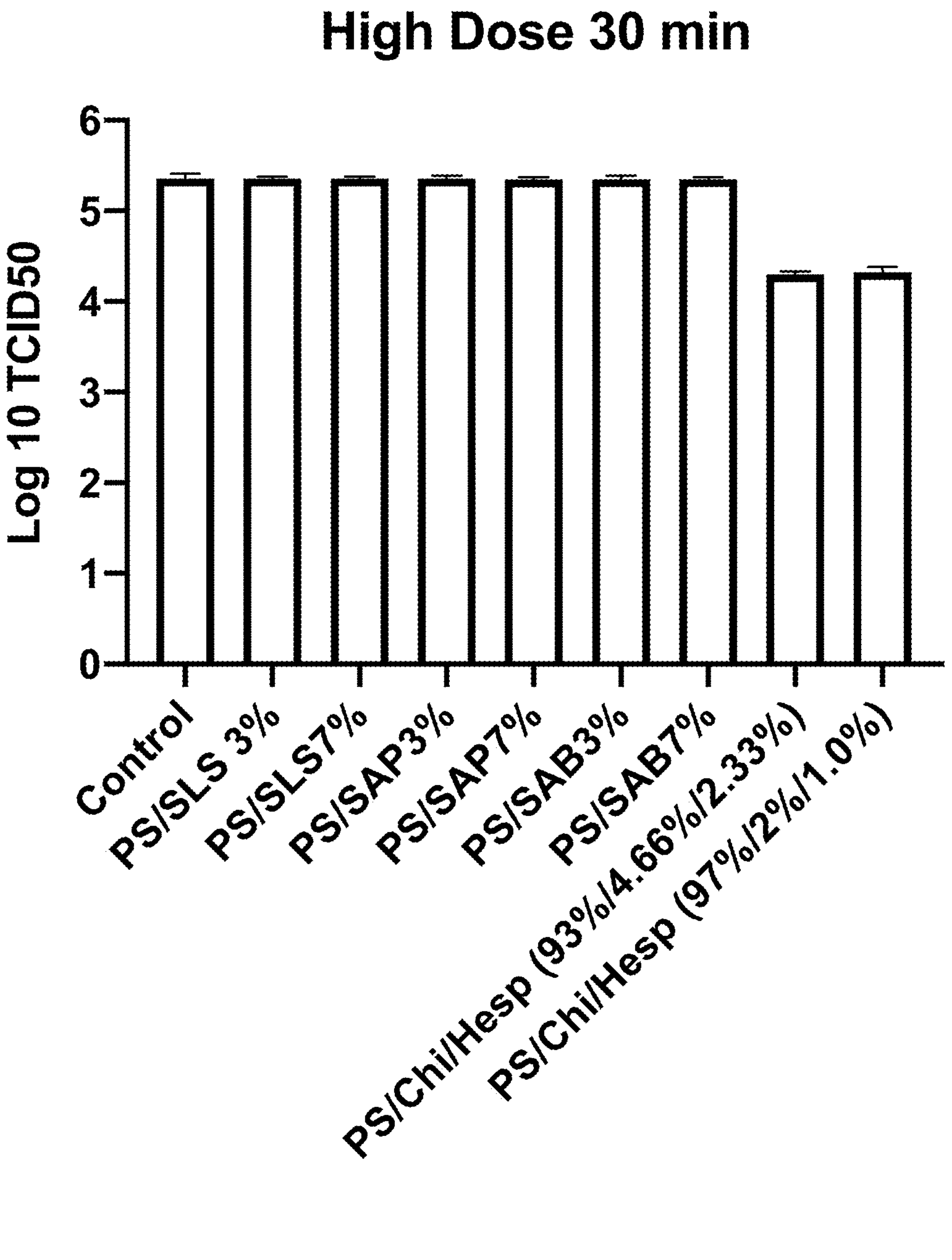
FIG. 2 is a graph comparing microbial growth for various materials in accordance with the present invention.
Figure 3:
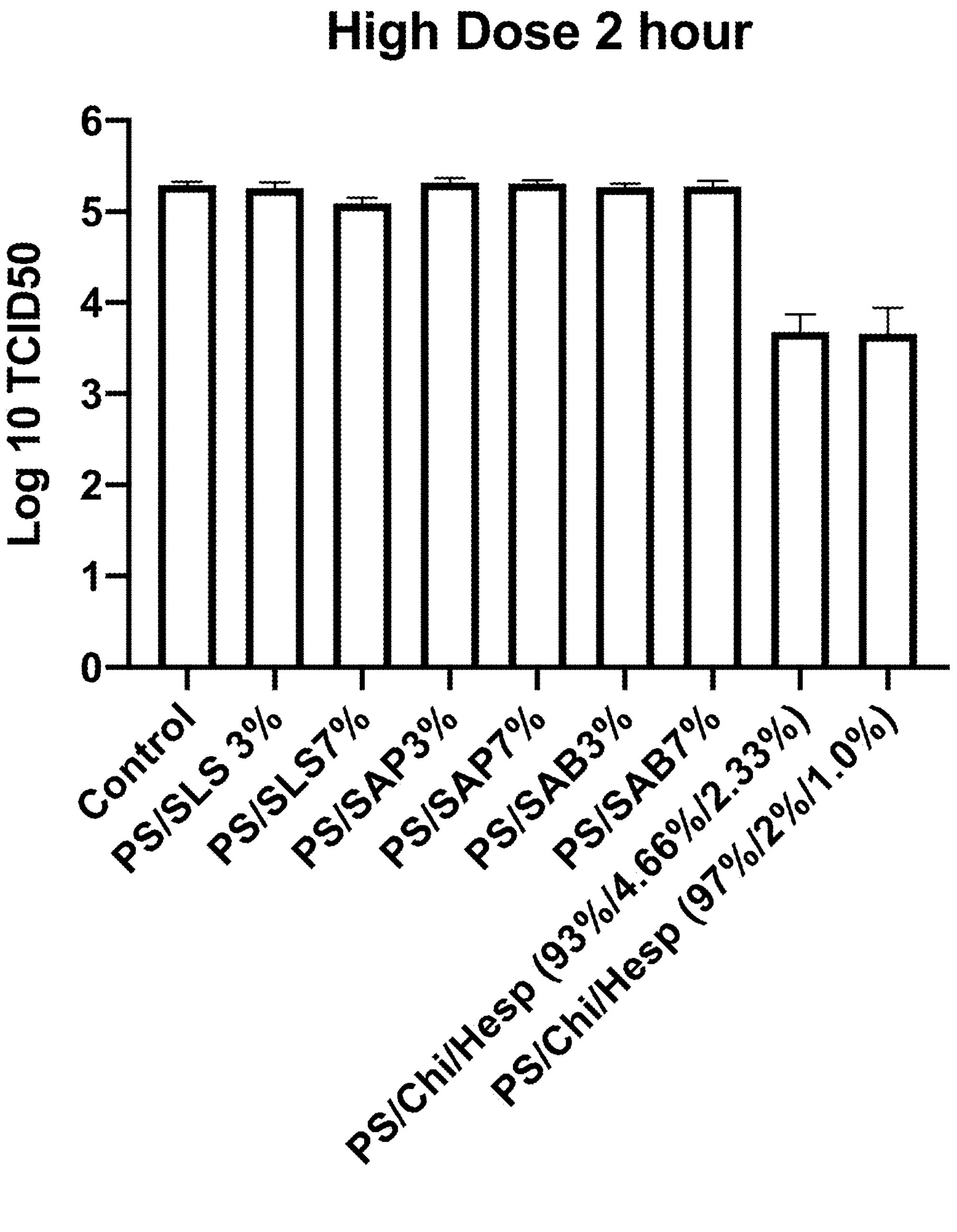
FIG. 3 is a graph comparing microbial growth for various materials in accordance with the present invention.
Figure 4:
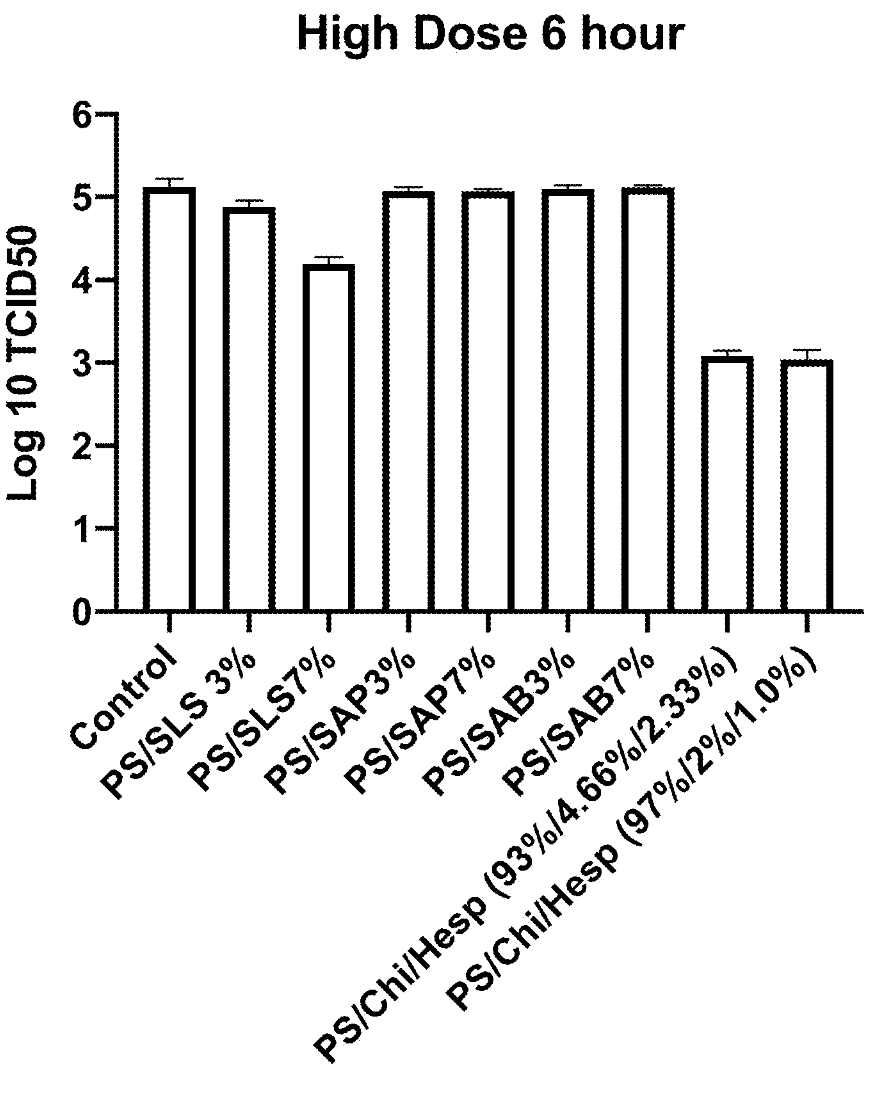
FIG. 4 is a graph comparing microbial growth for various materials in accordance with the present invention.
Figure 5:
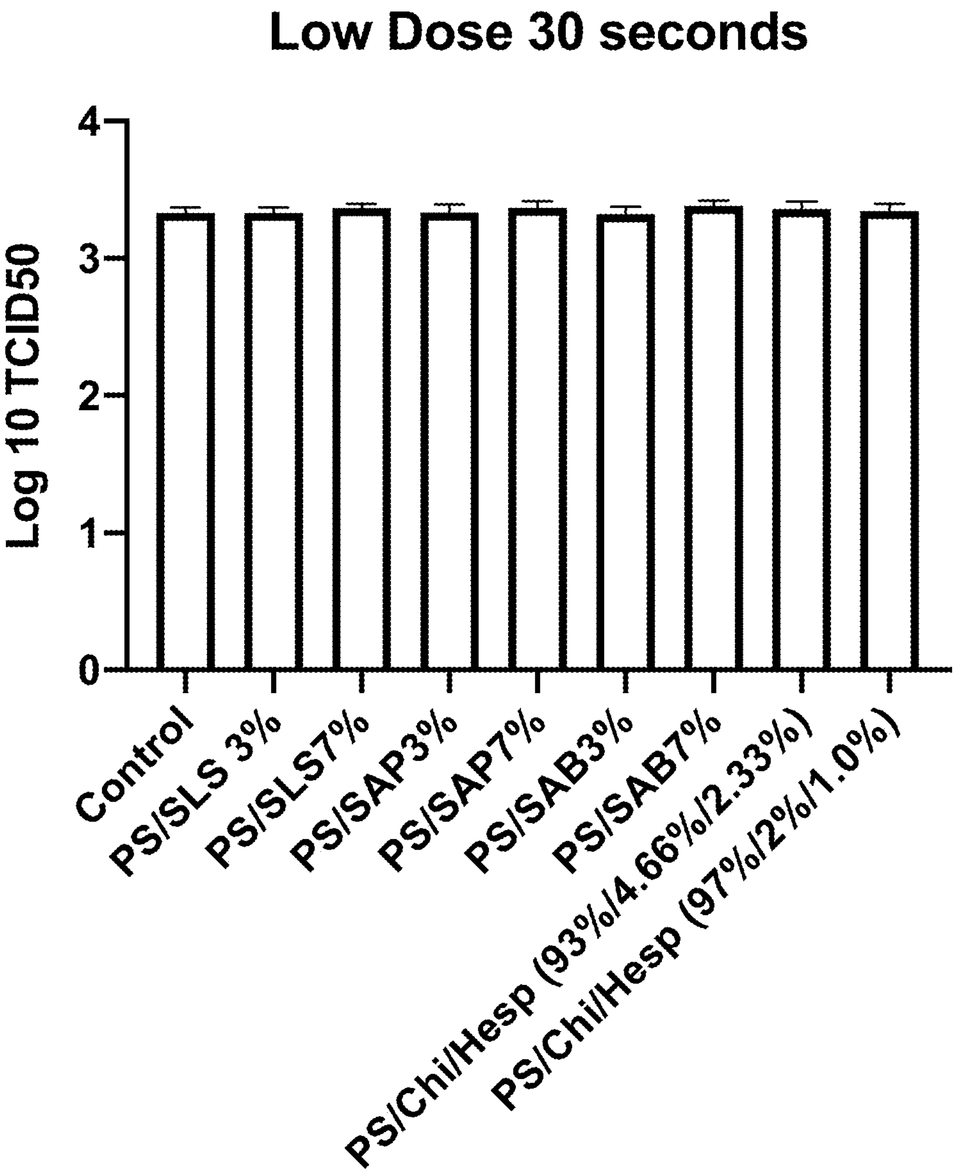
FIG. 5 is a graph comparing microbial growth for various materials in accordance with the present invention.
Figure 6:
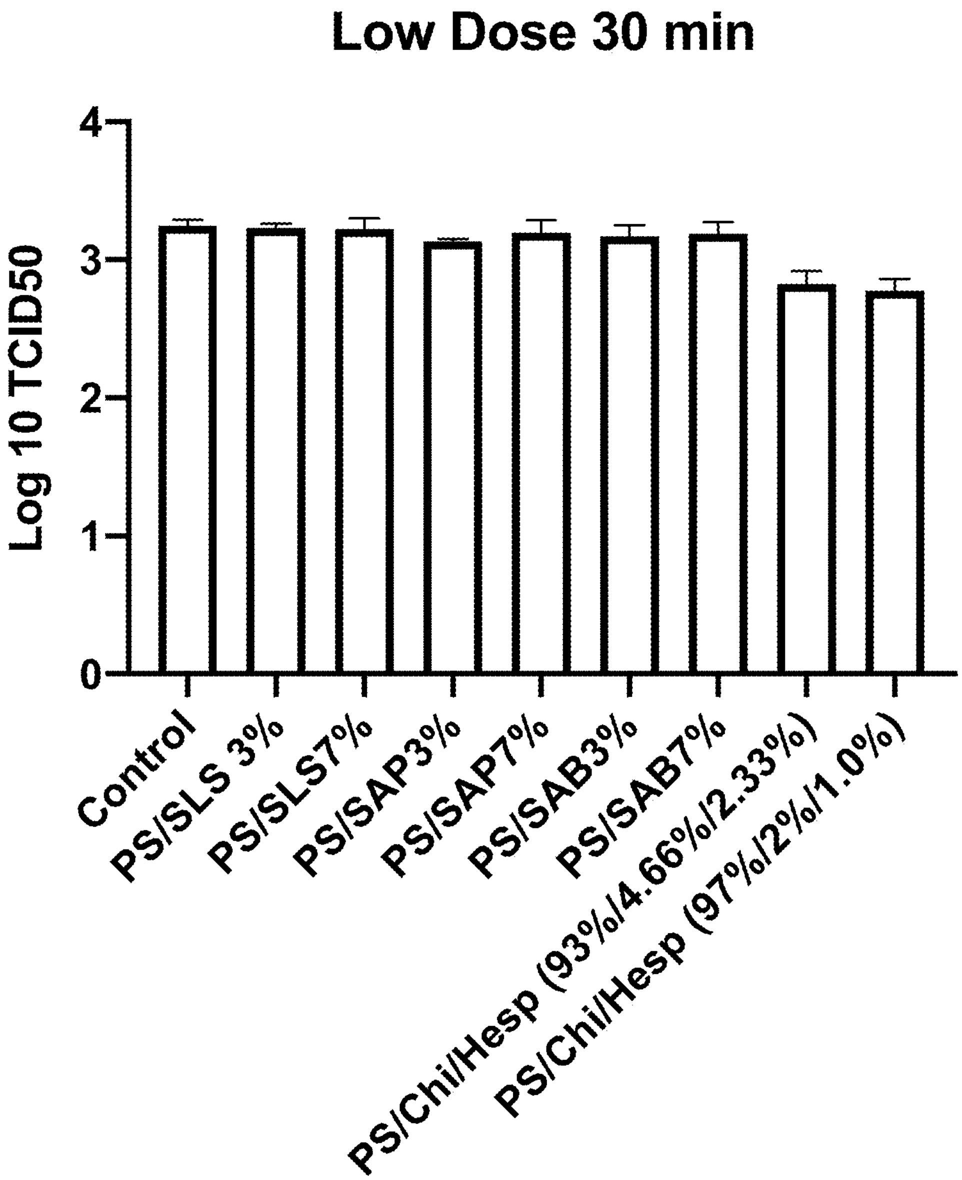
FIG. 6 is a graph comparing microbial growth for various materials in accordance with the present invention.
Figure 7:
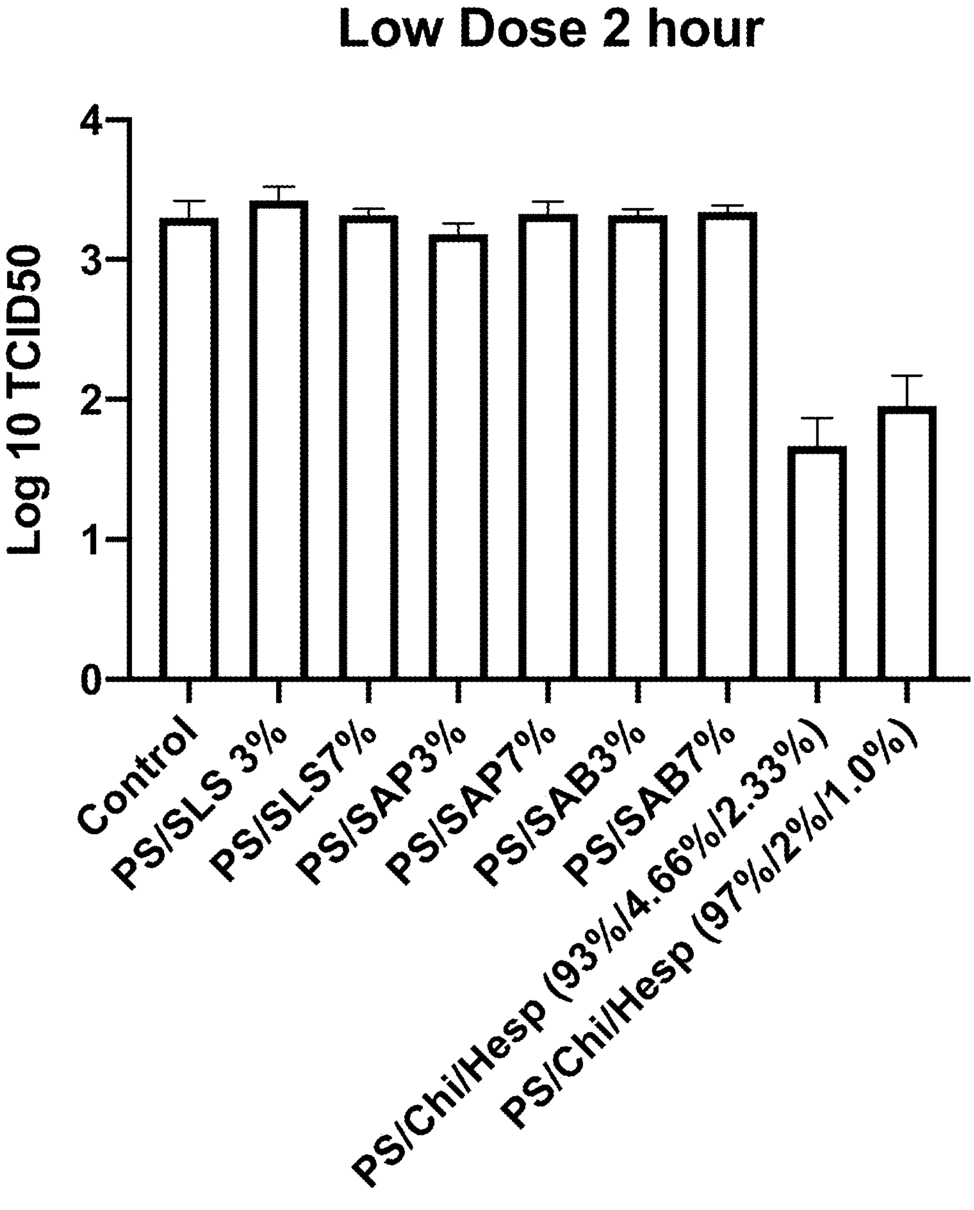
FIG. 7 is a graph comparing microbial growth for various materials in accordance with the present invention.
Figure 8:
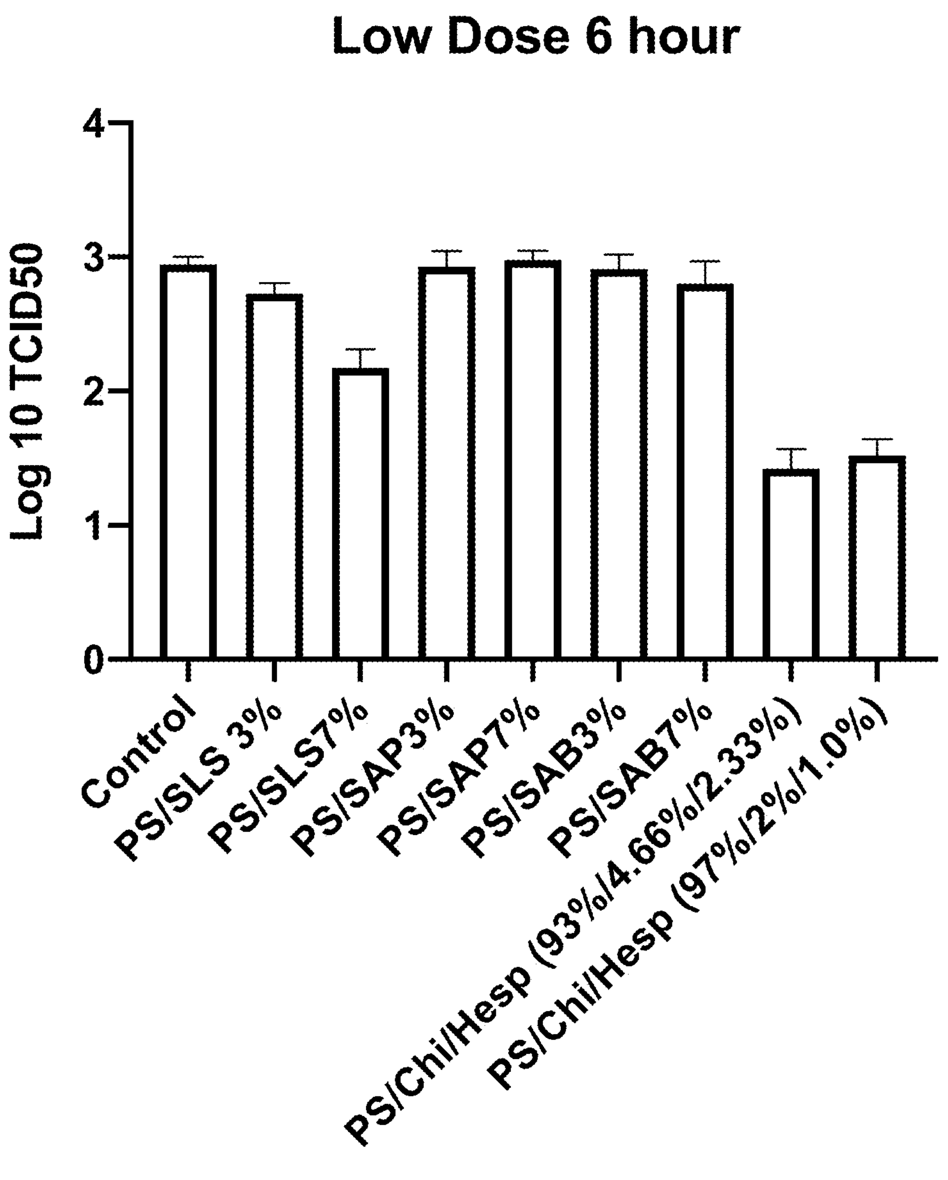
FIG. 8 is a graph comparing microbial growth for various materials in accordance with the present invention.

SLS: Sodium lauryl Sulfate
SAB: Strontium Aluminate Blue
SAP: Strontium Aluminate Purple
Chi: Chitosan
Hesp: Hesperidin
PS: Polystyrene Results The results from the experimental data are shown in the graphs of FIGS. 1-8.

Discussion of Experiments

No significant antiviral effects were observed in any of the samples following 30 seconds of exposure. Further, no significant antimicrobial effects were observed at both high inoculation and low inoculation $2.5\times10^5$ TCID50 or $2.5\times10^3$ TC1D50, respectively at 30 seconds.

Further, no significant anti-viral effect was observed at both high inoculum ($2.5\times10^5$ TCID50) or low inoculum ($2.5\times10^3$ TCID50) at 30 minutes in PS/SLS and PS/SAB samples.

A significant anti-viral effect ($p<0.05$) was observed in PS/Chi/Hesp samples (both concentrations) at 30 minutes with high inoculum ($2.5\times10^5$ TCID50). A trend towards anti-viral effect was observed with low inoculum but did not reach statistical significance ($p=0.08$).

No significant anti-viral effect was observed at both high inoculum ($2.5\times10^5$ TCID50) or low inoculum ($2.5\times10^3$ TCID50) at 2 hours in PS/SLS and PS/SAB samples.

A significant anti-viral effect ($p<0.001$) was observed in PS/Chi/Hesp samples (both concentrations) at 2 hours with both high inoculum ($2.5\times10^5$ TCID50) and low inoculum ($2.5\times10^3$ TCID50).

No significant anti-viral effect was observed at both high inoculum ($2.5\times10^5$ TCID50) or low inoculum ($2.5\times10^3$ TCID50) at 6 hours in PS/SLS (3%) and PS/SAB samples. However, a modest reduction in viral titers was observed in PS/SLS 7% samples ($p<0.05$).

A significant anti-viral effect ($p<0.001$) was observed in PS/Chi/Hesp samples (both concentrations) at 6 hours with both high inoculum ($2.5\times10^5$ TCID50) and low inoculum ($2.5\times10^3$ TCID50).

Limitations of the Study

These studies (six samples) are done with a protocol adapted in accordance with ISO22196. Therefore, the starting SARS-CoV-2 concentration is at $2.5\times10^5$ per 1"×1" surface area in 400 ul volume. The incubation is at 25° C. and at relative humidity of approx. 50%.

All samples were tested at lower viral concentrations ($2.5\times10^3$ TCID50). This low viral concentration is not in accordance with ISO standards.

Plastics coated with PS/Chitosan/Hesperidin at 93%/4.66%/2.33% and PS/Chitosan/Hesperidin at 97%/2%/1% reduced SARS-CoV-2 by more than 1 $\log_{10}$ fold (90% reduction) by 30 minutes and approximately 2 $\log_{10}$ fold (99% reduction) in 2 hours.

Plastics coated with PS/SLS at 7% reduced SARS-CoV-2 by approximately 1 $\log_{10}$ fold (90%) in 6 hours.

The following is a summary of the test conditions:

(Testing of BioPlastics for Antiviral Properties)

Objective

Initial screen to determine the potential antiviral properties of target materials (BioPlastics) with SARS-CoV-2 (WA1/USA-2020) as target microbe. At least one-log fold reduction in $TCID_{50}$ titers will be considered for further characterization. (Based on ISO22196-SARS-CoV-2)

Target

Control Material/Plastic or films (1 number in triplicates)
Coated or treated Plastic or films (12 numbers in triplicates)

Summary

Material were wiped with 70% ethanol with contact time of at least 3 minutes. 400 μl of medium containing a pre-defined titer of SARS-CoV-2 (WM/USA-2020 at $2.5\times10^3$ and $2.5\times10^5$ PFU/ml) will be deposited on 1"×1" each type of material (in triplicates) inside the B2 biosafety cabinet in a certified BSL-3 lab. The films/materials were covered with a thin film and incubated at 25° C. for 30 s, 30 m, and 6 h 24 in a humidified chamber. Material washed thrice with 300 μl of medium and collected. 100 μl of neat, 1:10, 1:100, and 1:1000 dilutions of collected medium will be deposited on Vero E6 cells. After 72 hours of incubation, viable viral titers were enumerated by $TCID_{50}$ assay. Tests performed in triplicates. A one-log fold reduction in viral titers compared to inoculum and control materials are considered significant in the initial screening.

Materials 60 samples of the control material at both 3% and 7%. Both high and low concentrations tested.

SARS-CoV-2 Infection Assay/$TCID_{50}$ General Protocol—MJN—Adapted from Sutton Lab 1. Prepare stock solution at 20 mg/mL in DMSO. Aliquot and store at −20° C.
2. Seed designated cell type in either 24- or 96-well plate 24 hr prior to infection. Place in $CO_2$ incubator at 37° C.
3. On day of infection, prepare compound working solutions to specified concentrations and dilute viral stock for targeted MOI.
4. Add virus suspension, treatment, or combination of the two as necessary to individual wells at either −2 hr, 0 hr, or +2 hr timepoints.
5. Incubate virus with cells for 1 hr at 37° C., and then aspirate virus suspension.
6. Replace with treatment compound or plain media, and incubate cells for predetermined time.
7. Following incubation, collect supernatant from each well and spin down to purify.
8. For 24-well $TCID_{50}$, seed plated with Vero E6 cells 24 hr prior to assay. Place in $CO_2$ incubator at 37° C.
9. Serially dilute stock concentrations at 1:10 out to $10^{-10}$.
10. Aspirate old media from Vero E6 cells and add 900 μL/well of fresh media with 2% FBS.
11. Starting with the most dilute supernatant sample ($10^{-9}$, add 100 μL of each sample to four pre-labeled Vero E6 wells. Continue adding 100 uL of each sample to corresponding wells, working from the most dilute to the most concentrated samples.
12. Make sure to have untreated wells for negative controls.
13. Incubate at 37° C. for 72 hrs before reading cytopathic effects and calculating $TCID_{50}$ values.

Experiment 3

Samples 1-8 tested for antimicrobial activity. Samples 1-8 are as follows:

Sample 1—Untreated Paper;

Sample 2—Coated Paper—Strontium Aluminate Blue 3%;

Sample 3—Coated Paper—SLS 2%;

Sample 4—Coated Paper—Chitosan 3%;

Sample 5—Coated Paper—Hesperidin 1.29%;

Sample 6—Coated Paper—Chitosan 1.5%/Hesperidin 1%;

Sample 7—SBSC Untreated Control; and

Sample 8—Cytotoxicity Optimization.

ISO 21702 specifies a method of evaluating virucidal activity of non-porous surfaces.

Each product was tested using clean test condition (no additional soil).

| Test Method ISO21702: 2019 - Measurement of antiviral activity on plastics and other non-porous surfaces | | |
|---|---|---|
| Inoculum: Human coronavirus (OC43) Notes Section | Interval | Result |

-continued

| | | |
|---|---|---|
| Sample #1 Untreated Paper baseline (32) | | |
| virus concentration | 0 m | 6.1 Log10 TCID50/sq cm |
| percent reduction = 78.5 | 1 m | 0.7 Log10 Reduction |
| percent reduction = 90 | 5 m | 1 Log10 Reduction |
| percent reduction = 85.3 | 1 hr | 0.8 Log10 Reduction |
| percent reduction = 90 | 5 hr | 1 Log10 Reduction |
| Sample #2 Coated Paper - Strontium Aluminate Blue 3% (24 replicates) | | |
| virus concentration | 0 m | 6 Log10 TCID50/sq cm |
| percent reduction = 90 | 1 m | 1 Log10 Reduction |
| percent reduction = 68.4 | 5 m | 0.5 Log10 Reduction |
| percent reduction = 85.3 | 1 hr | 0.8 Log10 Reduction |
| percent reduction = 68.4 | 5 hr | 0.5 Log10 Reduction |
| Sample #3 Coated Paper - SLS 2% (24 replicates) | | |
| virus concentration | 0 m | 6.5 Log10 TCID50/sq cm |
| percent reduction = 78.5 | 1 m | 0.7 Log10 Reduction |
| percent reduction = 78.5 | 5 m | 0.7 Log10 Reduction |
| percent reduction = 78.5 | 1 hr | 0.7 Log10 Reduction |
| percent reduction = 96.8 | 5 hr | 1.5 Log10 Reduction |
| Sample #4 Coated Paper - Chitosan 3% (24 replicates) | | |
| virus concentration | 0 m | 6.5 Log10 TCID50/sq cm |
| percent reduction = 85.3 | 1 m | 0.8 Log10 Reduction |
| percent reduction = 68.4 | 5 m | 0.5 Log10 Reduction |
| percent reduction = 53.6 | 1 hr | 0.3 Log10 Reduction |
| percent reduction = 90 | 5 hr | 1 Log10 Reduction |
| Sample #5 Coated Paper - Hesperidin 1.29% (24 replicates) | | |
| virus concentration | 0 m | 6.8 Log10 TCID50/sq cm |
| percent reduction = 78.5 | 1 m | 0.7 Log10 Reduction |
| percent reduction = 53.6 | 5 m | 0.3 Log10 Reduction |
| percent reduction = 68.4 | 1 hr | 0.5 Log10 Reduction |
| percent reduction = 90 | 5 hr | 1 Log10 Reduction |
| Sample #6 Coated Paper - Chitosan 1.5%/Hesperidin 1% (24 replicates) | | |
| virus concentration | 0 m | 6.5 Log10 TCID50/sq cm |
| percent reduction = 78.5 | 1 m | 0.7 Log10 Reduction |
| percent reduction = 53.6 | 5 m | 0.3 Log10 Reduction |
| percent reduction = 31.9 | 1 hr | 0.2 Log10 Reduction |
| percent reduction = 78.5 | 5 hr | 0.7 Log10 Reduction |
| Sample #7 SBSC Untreated Control | | |
| virus concentration | 0 m | 6.8 Log10 TCID50/sq cm |
| virus concentration | 1 m | 6.5 Log10 TCID50/sq cm |
| virus concentration | 5 m | 6.5 Log10 TCID50/sq cm |
| virus concentration | 1 hr | 6.1 Log10 TCID50/sq cm |
| virus concentration | 5 hr | 6.1 Log10 TCID50/sq cm |

| Test Method ISO21702 Inherent Cytotoxicity Optimization Sample #8 Cytotoxicity Optimization | | |
|---|---|---|
| Inoculum: None ( ) Notes Section | Interval | Result |
| | sample 1 | negative |
| | sample 2 | negative |
| | sample 3 | negative |
| | sample 4 | negative |
| | sample 5 | negative |

ISO 21702:2019—Measurement of Antiviral Activity on Plastics and Other Non-Porous Surfaces The ISO 21702 method is used to evaluate the virucidal efficacy of a non-porous product. Testing can incorporate different exposure times, soiling, and virus types and other variables according to the test standard or specific needs of a product. The most common test conditions employ the standard method protocol requiring a 24-hour exposure to the test material depending on the intended use of the product. Test virus are prepared in advance of the testing followed by a determination of viral titer. The inocula created is then utilized as the inocula for the exposure of the test material to the virus.

ISO 21702 Inherent Cytotoxicity Optimization

Antiviral testing requires the use of host cells for propagation and enumeration of the viral concentration. The host cells must be viable and biologically intact to allow viral infection. Successful infection by the virus results in the replication and ultimate lysis and loss of the host cell. This process provides the means by which viruses are measured. Cytotoxicity of the host cell as a result of any chemical carry-over from the test sample can affect the biological viability of the host cell and interfere with needed processes subsequent to the exposure of the cells to the virus. This interference is generally considered as the inherent-cytotoxicity of the test sample.

The test is conducted by incubating the test sample for 30 seconds with the neutralizing recovery solution, followed by exposure of the host cells to eight concentrations of the recovered solution. Inherent cytotoxicity is identified by the loss of the cell culture viability.

Project List

1. Untreated Paper baseline (32)
2. Coated Paper—Strontium Aluminate Blue 3% (24 replicates)
3. Coated Paper—SLS 2% (24 replicates)
4. Coated Paper—Chitosan 3% (24 replicates)
5. Coated Paper—Hesperidin 1.29% (24 replicates)
6. Coated Paper—Chitosan 1.5%/Hesperidin 1% (24 replicates)
7. SBSC Untreated Control
8. Cytotoxicity Optimization Testing Inoculum Preparation A known viral titer suspension is prepared to a concentration of at least 106 TCID50/ml. Passaged of the virus are not used beyond ten passes from the original seed culture.

Experimental Conditions

Following inoculation, the samples are incubated at 25° C.+/−1 C (unless otherwise specified). The incubation is conducted to prevent the inoculum from drying while in contact with the test surface. Following the incubation period, the virus is recovered in neutralizing media and then diluted for culturing.

Recovery of Virus from Test Specimens.

Two time points are created for each test item, a washout of the inoculated sample is collected immediately after inoculation by addition of the selected neutralizer solution by placing the sample into a vial and adding 10 ml of the neutralizer, followed by vortexing.

A second recovery is created following the intended incubation time (24 hr), after which the sample is placed into a vial with 10 ml of the neutralizing solution and vortexed.

Following the test sample neutralization, aliquotes of the sample are recovered and used to determine the infective titer following the respective incubation periods.

Viral Inoculum Preparation

Viruses are prepared by growing the required host cell culture monolayer to a density of approximately 90% confluency. The cell culture is then washed and inoculated with a prepared virus inoculum. Cells are maintained at to 37° C. in a 5% $CO_2$ atmosphere and observed for viral replication, as indicated by cell cytotoxic effects. Within 4 to 7 days, the cell culture is harvested, and cell debris is removed by centrifugation at 1 k×g for 5 min. The virus culture is then titered by serial plating according to the TCID50 methodology.

TCID50 Cell Plates

Cell plates are prepared for use in determining the viral concentration. 96-well 200 ul plates are inoculated with the host cell-specific to the virus at a concentration of approximately $3^5$/ml. The plates are incubated with full growth media as appropriate for the cell line. Once the cells are established, they are ready for inoculation with the virus. The plates are washed 2× with PBS, and then 100 µl of viral maintenance media is added appropriate to the virus in test. The cell plates are now ready for inoculation with the recovered test samples.

Inoculation of Test Specimens

The test substance is inoculated by pipetting 0.2 ml of the desired inoculum preparation onto the test substance surface. The inoculum solution is then covered with a piece of precut parafilm measuring approximately 40 mm×40 mm−F/−2 mm. The parafilm is gently pressed so that the test inoculum spreads to the edges but does not exceed the boundary of the sandwiched surface faces. Each sample replicate is placed into a sterile petri dish, and then a separate container for incubation.

Incubation of the Inoculated Test Specimens

Viral Inoculum

The test substances are incubated at a temperature of 25+/−1° C. in a hydrated sealed environment to provide a relative humidity of not less than 90%.

Recovery of the Inoculum

Virus Recovery

Following the incubation period, the samples were removed from the incubators, and neutralizing media was added to the samples directly and triturated 3 to 4 times. The total volume of neutralizer added was 10 ml. The neutralizer was recovered, and 1 ml of the solution was added to a 96-well 2 ml sample block in a column-specific manner to allow for sample processing by serial dilutions. Gel filtration is used for samples demonstrating a positive inherent cytotoxicity test. Gel filtration is conducted by recovery of a neutralized solution from the sample and then passing 1 ml through a prepared gel filtration bed volume of 2 ml.

Viral Quantitation

Viral counts are determined by the process of serial-endpoint dilution according to the TCID50 method. The sample recovery block has 1 ml of the neutralized inoculum placed into row one of the 8-row 96-well block. The 96-well block is prepared by placing 900 µl into each well from row 2 to row 8. Once the sample is added to row 1, a serial 1/10 dilution is conducted by removing 100 ul from row one and pipetted into row two, followed by trituration to mix. The process is continued for each subsequent row until a total of 7 serial dilutions are performed.

The diluted samples are then used to inoculate prepared 96-well cell plates. For a 96-well block, each respective well is added to the sample well in two replicate 96-well cell plates. The addition is conducted by pipetting 100 µl of the diluted recovered viral sample to the prepared cell plate; the total volume in the plate is 200 µl. Once all wells are transferred to the cell plates, the plates are incubated at 35° C., 5% $CO_2$ for 2 to 6 days, depending on the characteristics of the viral cytopathic (CPE) progression. Following the incubation period, the plates are removed from the incubator, fixed, and stained to identify CPE as compared to intact cell monolayers. The determination of CPE/well is counted and used to determine the $TCID_{50}$ based on the representative dilution factor exhibited for CPE of each viral sample.

Reagents

Dulbecco's Modified Eagle Medium (DMEM; EM-1)
Soybean Casein Lecithin Polysorbate 80 Medium (SCDLP)
Phosphate Buffered Saline (PBS)
Formaldehyde solution (3.7%)

Crystal Violet (0.5%)
Fetal bovine serum
Viral Maintenance medium
Trypsin
Ethylenediaminetetraacetic acid solution (EDTA)
Laboratory RO water, deionized Test Organisms (by Method) (Inventory ID/lot #)

ISO 21702:2019—Measurement of antiviral activity on plastics and
other non-porous surfaces
Human coronavirus (OC43); VR-1558 70035458
(Betacoronavirus 1; Strain:OC43)

Sample Preparations

Each test substance was prepared according to the analytic method requirements.

Each test sample is prepared in triplicate for each time point.

As available, the samples are cut into a piece approximately 50×50 mm. Sample variability is accommodated as needed for the standard test; notes regarding differences in the sample characteristic are recorded in the report summary.

Ideally, the test sample will be flat and non-hydrophobic and allow layering of the inoculum over the sample surface.

Calculations

End-point dilutions are conducted with the recovered virus inocula using serial log 10 dilution factors. TCID50 (Spearman-Karber; modified by M. A.

Ramakrishnan) is used to determine the concentration of the inoculated virus based on the outcome of the end-point dilution resulting in the CTE of the host cells. It represents the end-point dilution (average) of the host cell monolayers exhibiting the CTE.

Log 10 50% end-point Dilution=−[(total number of CTE wells/total number of dilution replicates)+0.5]×log dilution factor R=−[Total CTE/replicate count per dilution)+0.5]×Log dilution factor R=The log 50% end-point dilution Total CTE—is the average of the common logarithm of the number of viable virus, in cells/cm 2, recovered from the untreated test specimens immediately after inoculation Replicate count per dilution—the numbers of well replicates inoculated at each dilution Log dilution factor—is the dilution factor used for each serial dilution (typically 10× or log 10(10)=1)

Antiviral Activity Value

R=U(t24)−C(t24)

R=the antiviral activity value

C(t24)=the common logarithm average of 3 infectivity titer values after 24 hours from the untreated material U(t24)=the common logarithm average of 3 infectivity titer values after the contact time (24 hr) with the treated (test) sample Statistical Methods Replicate data are utilized in the calculation by the Spearman-Karber method, no additional statistical analysis is conducted.

Results from this experiment are summarized in the following Tables 1-6:

TABLE 1

| Spearman-Karber Method (Modified, Ramakrishan MA) OC43 | | | | | | | SAMPLE No. | | | | |
|---|---|---|---|---|---|---|---|---|---|---|---|
| | | Control | Control | Control | Control | Control | Sample 1 | | | | |
| Titer | Virus | (T0) | (Tx1) | (Tx2) | (Tx3) | (Tx4) | (T0) | 1 m | 5 m | 1 h | 5 h |
| replicate count | 6 | 6 | 6 | 6 | 6 | 6 | 6 | 6 | 6 | 6 | 6 |
| dilution factor (D) | 10 | 10 | 10 | 10 | 10 | 10 | 10 | 10 | 10 | 10 | 10 |
| washout volume (ml)[V] | 20 | 20 | 20 | 20 | 20 | 20 | 20 | 20 | 20 | 20 | 20 |
| proximate area (sq cm)[A] | 6.5 | 6.5 | 6.5 | 6.5 | 6.5 | 6.5 | 6.5 | 6.5 | 6.5 | 6.5 | 6.5 |
| inoculation volume (ml) | 0.2 | 0.2 | 0.2 | 0.2 | 0.2 | 0.2 | 0.2 | 0.2 | 0.2 | 0.2 | 0.2 |

| Spearman-Karber Method | SAMPLE No. | | | | | | | | | |
|---|---|---|---|---|---|---|---|---|---|---|
| (Modified, Ramakrishan MA) OC43 | Sample 2 | | | | | Sample 3 | | | | |
| Titer | (T0) | 1 M | 5 m | 1 h | 5 h | (T0) | 1 m | 5 m | 1 h | 5 h |
| replicate count | 6 | 6 | 6 | 6 | 6 | 6 | 6 | 6 | 6 | 6 |
| dilution factor (D) | 10 | 10 | 10 | 10 | 10 | 10 | 10 | 10 | 10 | 10 |
| washout volume (ml)[V] | 20 | 20 | 20 | 20 | 20 | 20 | 20 | 20 | 20 | 20 |
| proximate area (sq cm)[A] | 7 | 6.5 | 6.5 | 6.5 | 7 | 6.5 | 6.5 | 6.5 | 6.5 | 6.5 |
| inoculation volume (ml) | 0 | 0.2 | 0.2 | 0.2 | 0 | 0.2 | 0.2 | 0.2 | 0.2 | 0.2 |

| dilution factor (df) | (+) | (+) | (+) | (+) | (+) | (+) | (+) | (+) | (+) | (+) | (+) | (+) | (+) | (+) | (+) | (+) | (+) | (+) | (+) | (+) | (+) |
|---|---|---|---|---|---|---|---|---|---|---|---|---|---|---|---|---|---|---|---|---|---|
| $10^0$ | 6 | 6 | 6 | 6 | 6 | 6 | 6 | 6 | 6 | 6 | 6 | 6 | 6 | 6 | 6 | 6 | 6 | 6 | 6 | 6 | 6 |
| 10 | 6 | 6 | 6 | 6 | 6 | 6 | 6 | 6 | 6 | 6 | 6 | 6 | 6 | 6 | 6 | 6 | 6 | 6 | 6 | 6 | 6 |
| $10^2$ | 6 | 6 | 6 | 6 | 6 | 6 | 6 | 6 | 6 | 6 | 6 | 6 | 6 | 6 | 6 | 6 | 6 | 6 | 6 | 6 | 5 |
| $10^3$ | 6 | 6 | 6 | 6 | 6 | 6 | 6 | 6 | 3 | 3 | 6 | 6 | 4 | 5 | 3 | 5 | 6 | 6 | 4 | 3 | 0 |
| $10^4$ | 6 | 3 | 4 | 4 | 2 | 2 | 2 | 0 | 1 | 0 | 2 | 1 | 0 | 2 | 0 | 0 | 4 | 0 | 2 | 1 | 0 |
| $10^5$ | 4 | 0 | 0 | 0 | 0 | 0 | 0 | 0 | 0 | 0 | 0 | 0 | 0 | 0 | 0 | 0 | 0 | 0 | 0 | 0 | 0 |
| $10^6$ | 0 | 0 | 0 | 0 | 0 | 0 | 0 | 0 | 0 | 0 | 0 | 0 | 0 | 0 | 0 | 0 | 0 | 0 | 0 | 0 | 0 |
| $10^7$ | 0 | 0 | 0 | 0 | 0 | 0 | 0 | 0 | 0 | 0 | 0 | 0 | 0 | 0 | 0 | 0 | 0 | 0 | 0 | 0 | 0 |
| Cell Blank | 0 | 0 | 0 | 0 | 0 | 0 | 0 | 0 | 0 | 0 | 0 | 0 | 0 | 0 | 0 | 0 | 0 | 0 | 0 | 0 | 0 |

TABLE 2

| Infectivity Titer (N) | Log10 (TCID50/ well) | ALog(TCID50/ well) [C] | TCID50/ sq cm [10*C*D*V]/A | log10 |
|---|---|---|---|---|
| Virus | 5.7 | $4.6 \times 10^5$ | $2.86 \times 10^7$ | 7.5 |
| Control (Tx0) | 4.5 | $3.2 \times 10^4$ | $6.17 \times 10^6$ | 6.8 |
| Control (Tx1) | 4.7 | $4.5 \times 10^4$ | $2.86 \times 10^6$ | 6.5 |
| Control (Tx2) | 4.7 | $4.6 \times 10^4$ | $2.86 \times 10^6$ | 6.5 |
| Control (Tx3) | 4.3 | $2.2 \times 10^4$ | $1.33 \times 10^6$ | 6.1 |
| Control (Tx4) | 4.3 | $2.2 \times 10^4$ | $1.33 \times 10^6$ | 6.1 |
| Sample 1 (T0) | 4.3 | $2.2 \times 10^4$ | $1.33 \times 10^6$ | 6.1 |
| 1 m | 4.0 | $1.0 \times 10^4$ | $6.15 \times 10^5$ | 5.8 |
| 5 m | 3.7 | $4.6 \times 10^3$ | $2.86 \times 10^5$ | 5.5 |
| 1 h | 3.5 | $3.2 \times 10^3$ | $1.95 \times 10^5$ | 5.3 |
| 5 h | 3.3 | $2.2 \times 10^3$ | $1.33 \times 10^5$ | 5.1 |
| Sample 2 (T0) | 4.2 | $1.5 \times 10^4$ | $9.03 \times 10^5$ | 6.0 |
| 1 m | 3.7 | $4.6 \times 10^3$ | $2.86 \times 10^5$ | 5.5 |
| 5 m | 4.2 | $1.5 \times 10^4$ | $9.03 \times 10^5$ | 6.0 |
| 1 h | 3.5 | $3.2 \times 10^3$ | $1.95 \times 10^5$ | 5.3 |
| 5 h | 3.8 | $6.8 \times 10^3$ | $4.19 \times 10^5$ | 5.6 |
| Sample 3 (T0) | 4.7 | $4.6 \times 10^4$ | $2.86 \times 10^6$ | 6.5 |
| 1 m | 4.0 | $1.0 \times 10^4$ | $6.15 \times 10^5$ | 5.8 |
| 5 m | 4.0 | $1.0 \times 10^4$ | $6.15 \times 10^5$ | 5.8 |
| 1 h | 3.7 | $4.6 \times 10^3$ | $2.86 \times 10^5$ | 5.5 |
| 5 h | 2.8 | $6.8 \times 10^2$ | $4.19 \times 10^4$ | 4.6 |

TABLE 3

| Result | | | Log10 | Percent |
|---|---|---|---|---|
| Sample 1 | 1 m | R = U(Tx) − C(Tx) | 0.7 | 78.5 |
| | 5 m | | 1.0 | 90.0 |
| | 1 h | | 0.8 | 85.3 |
| | 5 h | | 1.0 | 90.0 |
| Sample 2 | 1 m | | 1.0 | 90.0 |
| | 5 m | | 0.5 | 68.4 |
| | 1 h | | 0.8 | 85.3 |
| | 5 h | | 0.5 | 68.4 |
| Sample 3 | 1 m | | 0.7 | 78.5 |
| | 5 m | | 0.7 | 78.5 |
| | 1 h | | 0.7 | 78.5 |
| | 5 h | | 1.5 | 96.8 |
| Control (T0) variability | | (Lmax − Lmin)/Lmean | 0.11 | |

Legend
(+) = CTE measured (active virus)
0 = no CTE measured
T = non-viral CTE
(Tx) = see data table for sample time point
Cytotoxicity measure of CTE due to the sample extracted without virus
Neutralization measure of the CTE due to the neutralizer used Although the invention has been described above in relation to preferred embodiments thereof, it will be understood by those skilled in the art that variations and modifications can be accomplished in these preferred embodiments without departing from the scope and spirit of the invention.

The invention claimed is:

1. An antimicrobial product comprising:

a base material, and a surface laminate comprising:

1-3% hesperidin, and 1-5% chitosan, thereby forming an antimicrobial surface laminate on the base material.

2. The antimicrobial product of claim 1, further comprising one or more polymers selected from the group consisting of polyethylene terephthalate (PET), high density polyethylene (HDPE), polyvinyl chloride (PVC), low density polyethylene (LDPE), polypropylene (PP), and polystyrene (PS).

3. The antimicrobial product of claim 2, wherein the one or more polymers are present in 92%-98% weight percent.

4. The antimicrobial product of claim 2, comprising in weight percent:

93%-97% polystyrene, and 2-5% chitosan.

5. The antimicrobial product of claim 2, comprising in weight percent:

93% polystyrene, 4.66% chitosan, and 2.33% hesperidin.

6. The antimicrobial product of claim 2, comprising in weight percent:

97% polystyrene,

2% chitosan, and

1% hesperidin.

7. The antimicrobial product of claim 1, wherein the base is plastic.

8. The antimicrobial product of claim 1, wherein the surface laminate further comprises a plastic polymer or plastic incorporated into the hesperidin and the chitosan.

9. The antimicrobial product of claim 1, wherein the base is paper.

10. The antimicrobial product of claim 1, wherein the material forms an exterior surface of a medical device.

* * * * *